United States Patent [19]
Von Seggern

[11] 3,716,116
[45] Feb. 13, 1973

[54] AUTOMATIC HYDRAULICALLY OPERATED SEAT BRAKE

[75] Inventor: Robert D. Von Seggern, Lincoln, Nebr.

[73] Assignee: Outboard Marine Corporation, Waukegan, Ill.

[22] Filed: March 2, 1971

[21] Appl. No.: 120,130

[52] U.S. Cl. .................................. 188/109, 303/19
[51] Int. Cl. ............................................. B60t 7/02
[58] Field of Search ........ 180/99, 101; 188/109, 170; 303/19

[56] References Cited

UNITED STATES PATENTS

| | | | |
|---|---|---|---|
| 3,280,933 | 10/1966 | Jones | 188/109 X |
| 3,332,522 | 7/1967 | Dence | 188/109 |
| 3,360,305 | 12/1967 | Ryskamp | 188/109 X |

*Primary Examiner*—Duane A. Reger
*Attorney*—Robert E. Clemency, John W. Michael, Gerrit D. Foster, Bayard H. Michael, Paul R. Puerner, Joseph A. Gemignani and Andrew O. Riteris

[57] ABSTRACT

Disclosed herein is a vehicle braking system including a brake shoe biased into braking engagement with a rotary member, and displaceable by hydraulic means from braking engagement with the rotary member, together with a pumping cylinder hydraulically communicating with said brake shoe displacing means cylinder and including a plunger operable to effect delivery of pressure fluid to said brake shoe displacing means, a seat movably mounted on said vehicle for movement relative to an in-use position, and a linkage engageable with said seat and engageable with said plunger to displace said plunger so as to deliver pressure fluid to said brake shoe displacing means and thereby to displace said brake shoe from braking engagement with the rotary member in response to movement of said seat to the in-use position, and further including means biasing said seat away from said in-use position, and means for controlling the rate of fluid flow between the pumping cylinder and the hydraulic brake shoe displacing means.

6 Claims, 2 Drawing Figures

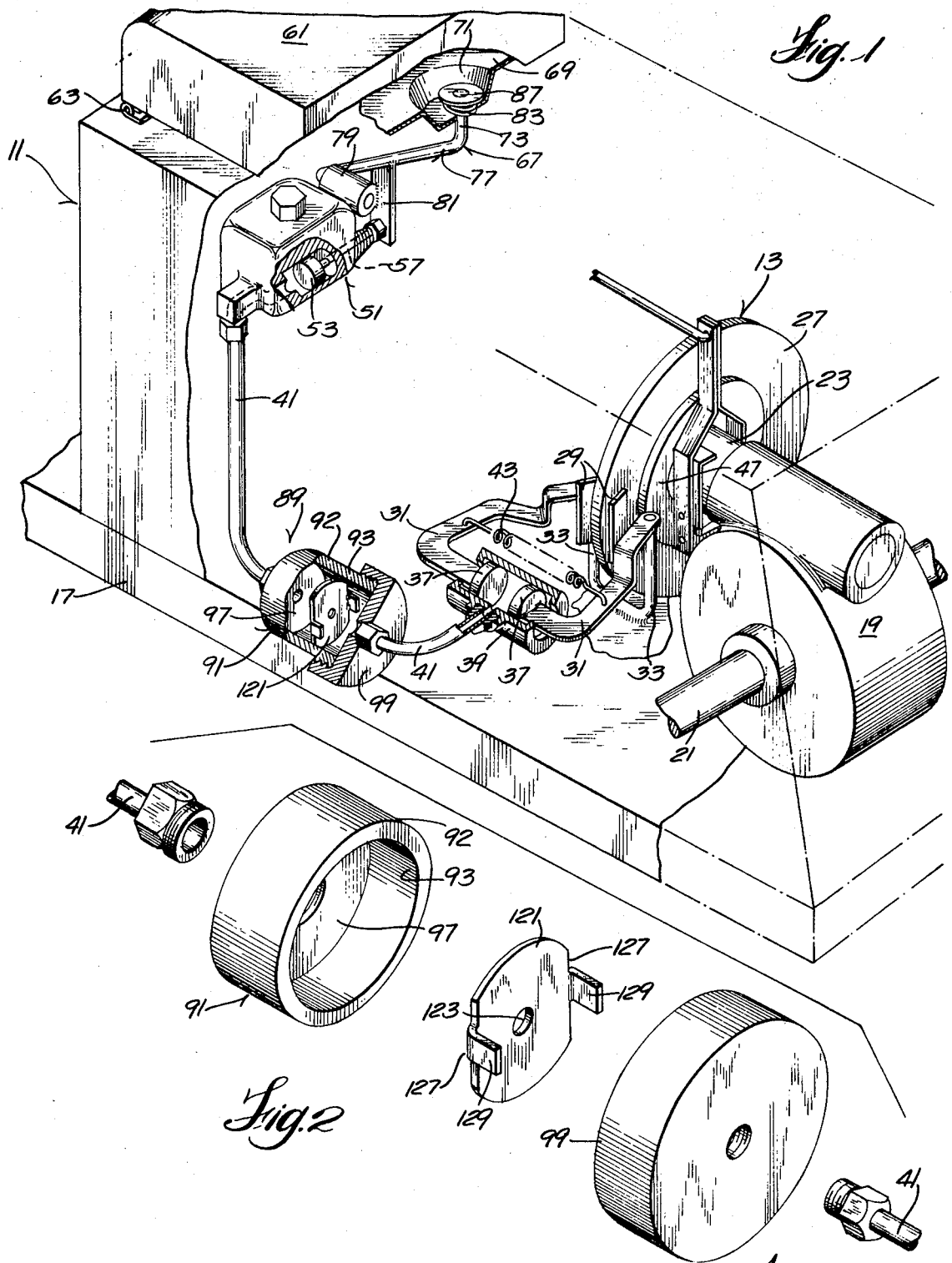

3,716,116

AUTOMATIC HYDRAULICALLY OPERATED SEAT BRAKE

BACKGROUND OF THE INVENTION

The invention relates to vehicle such as, for instance, golf carts and to braking systems for such golf carts. It is desirable in a golf cart that the vehicle be self-braking, i.e., that the vehicle employ a brake which, in the absence of the operator, will automatically engage to prevent vehicle movement and which is automatically released when the operator sits on the driver's seat. It has also been desirable to use a hydraulic system for releasing the brake in response to occupancy by the operator of the driver's seat.

The Dence U.S. Pat. No. 3,332,522 issued July 25, 1967, discloses a brake control system wherein occupation of the driver's seat by an operator is effective to open a valve which otherwise prevents hydraulic flow from a pump to a hydraulic device operative to release a self-setting brake.

SUMMARY OF THE INVENTION

The invention provides a braking system wherein the act of sitting on the driver's seat of a vehicle serves to hydraulically pump fluid which is effective to release the braking engagement of a brake shoe with a rotary drive member. More specifically, the invention provides a linkage which is engageable with a seat biased from an in-use position and which is also engageable with a plunger extending from a pumping cylinder so as to displace said plunger inwardly of the pumping cylinder in response to seat movement to the in-use position, whereby to effect delivery of pressure fluid from the pumping cylinder to a brake shoe displacing means so as to displace the brake shoe from braking engagement with the rotary member.

The invention also provides a braking system in which a pumping cylinder communicates with a brake shoe actuating cylinder through a flow control metering valve which is operable to permit relatively rapid fluid flow from the pumping cylinder to the actuating cylinder so as to provide prompt brake release and to provide relatively restricted fluid flow from the actuating cylinder to the pumping cylinder, at least as compared to flow in the opposite direction, so as to provide for relatively slow re-engagement of the brake. More specifically, in accordance with the invention, the valve includes a hollow valve housing and a valve member movable in the valve housing to a first position adjacent to one end of the interior of the valve housing in response to fluid flow from the actuating cylinder to the pumping cylinder and movable to a second position spaced from the other end of the valve housing in response to fluid flow from the pumping cylinder to the actuating cylinder. In addition, the valve member includes a central aperture which affords fluid flow in both positions and means defining peripheral openings between the valve member and the valve housing interior surface so as to afford increased fluid flow through the valve when the valve is in the second position spaced from the other end of the housing.

The invention also provides for return of fluid flow from the actuating cylinder to the pumping cylinder under the influence of a spring which also biases the brake shoe into engagement with the rotary member.

One of the principal objects of the invention is the provision of a hydraulically operated braking system in which the brake is released in response to fluid flow pumped by the act of sitting on the driver's seat.

Another of the principal objects of the invention is the provision of a hydraulically operated braking system in which brake release occurs rapidly in response to sitting on the driver's seat and in which brake engagement occurs relatively slowly in response to getting off of the driver's seat.

Another of the principal objects of the invention is the provision of a vehicle braking system which is economical to manufacture and install and which will provide reliable service over a long and useful life.

Other objects and advantages of the invention will become known by reference to the following description and accompanying drawings.

DRAWINGS

FIG. 1 is a schematic perspective view of a vehicle embodying a braking system in accordance with the invention.

FIG. 2 is an enlarged exploded perspective view of the metering valve incorporated in the braking system shown in FIG. 1.

DESCRIPTION OF THE INVENTION

Shown fragmentarily in the drawings is a vehicle 11, such as a golf cart, which vehicle includes a brake or braking system 13 in accordance with the invention. The vehicle 11 includes a frame or body 17 which supports a differential 19 including an output axle 21 supporting a pair of ground wheels (not shown) and a rotary input shaft 23 driven by a motor (not shown) and having mounted thereon a braking flange or member 27.

Associated with the braking flange 27 is one or more (two in the illustrated construction) brake shoes 29 carried on respective actuating arms or links 31 pivotally mounted on studs 33 extending from or forming a part of the vehicle frame 17. The ends of the arms 31 are connected to opposed pistons or rams 37 in a hydraulic actuating cylinder 39 having a fluid supply line 41 communicating with the cylinder 39 between the rams 37 in such manner that supply of fluid to the cylinder 39 causes the rams 37 to separate from each other and to extend from the cylinder 39, thereby actuating the links or arms 31 for pivotal movement so as to displace the brake shoes 29 from positions of braking engagement with the braking flange or member 27.

Means are provided for biasing the brake shoe supporting links 31 and therefor the brake shoes 29 toward positions in braking engagement with the braking flange 27 and for simultaneously displacing the rams 37 toward each other so as to urge hydraulic fluid outwardly from the actuating cylinder 39. While various arrangements can be employed, in the disclosed construction, such means comprises a tension spring 43 which is connected at its ends to the brake shoe supporting links 31 so as to draw the brake shoe supporting links 31 toward each other and thereby also to brakingly engage the brake shoes 29 with the braking flange 27, as well as to force hydraulic fluid from the cylinder 39.

There is also provided an auxiliary service brake 47 which can be manually set by the operator and which serves to releasably prevent rotation of the differential input shaft can also be independently employed.

In accordance with the invention, fluid is supplied to the actuating cylinder 39 through the hydraulic supply line 41 which communicates with a pumping cylinder 51 including a piston 53 connected to a plunger 57 which extends from the pumping cylinder 51 and which, when displaced inwardly toward the pumping cylinder 51, serves to pump hydraulic fluid from the pumping cylinder 51 to the actuating cylinder 39 and thereby to displace the brake shoes 29 from braking engagement with the braking flange 27.

In accordance with the invention, pumping operation of the cylinder 51 is provided in response to movement of a seat 61 to an in-use position. More particularly, the seat 61 is movably mounted on the frame 17 for pivotal movement about a hinge pin 63. Such seat movement to the in-use position occurring in response to sitting down of an operator, is effected to cause pumping operation of the cylinder 51 by reason of a linkage 67 which is engageable with both the seat 61 and with the plunger 57.

More specifically, the frame 17 includes a deck portion 69 which includes a recess 71 into which there extends a bent end portion 73 of an actuating lever 77 which is pivotally mounted in a bushing 79 mounted on the frame 17 with the bushing axis extending transversely of the direction of plunger movement.

Extending from the actuating lever 77 is a striker plate 81 which is engageable with the outer end of the plunger 57 so as to displace the plunger 57 to the left as shown in FIG. 1 when the actuating lever 77 swings in the clockwise direction as seen in FIG. 1 in response to movement of the seat 61 to the in-use position.

The linkage 67 also includes means for biasing the seat 61 from the in-use position and for biasing the actuating lever 77 in the counterclockwise direction so as to relieve engagement of the striker plate 81 with the plunger 57 and thereby permit hydraulic fluid flow from the actuating cylinder 39 to the pumping cylinder 51, which flow occurs during re-engagement of the brake when the seat 61 has moved from the in-use position. While various arrangements can be employed, in the disclosed construction, the biasing means comprises a helical spring 83 which surrounds the end portion 73 of the actuating lever 77 and which is seated against the bottom of the recess 71 and against a flange or head 87 at the terminal end of the bent end portion 73 of the actuating lever 77.

Also in accordance with the invention, fluid flow control means 89 are provided for affording relatively rapid flow of hydraulic fluid from the pumping cylinder 51 to the actuating cylinder 39 and for relatively restraining fluid flow from the actuating cylinder 39 to the pumping cylinder 51. As a consequence, brake release occurs rapidly when an operator sits on the seat 61, whereas brake engagement occurs relatively gradually in response to the action of the spring 43 when the operator leaves the seat 61.

While various arrangements can be employed, in the disclosed construction, the fluid flow control means 89 comprises a metering valve 91 interposed in the fluid supply line 41 and including a hollow valve housing 92 comprising a cylindrical housing member 93 which, except for communication with the supply line 41, is closed at one end by a wall 97 and closed at the other end by a threaded cap 99. Located within the cylindrical interior of the valve 91 is a valve member 121 which is movable axially of the housing member 93 in response to fluid flow between a position against the end wall 97 of the housing member 93 and a position against the cap 99. The valve member 121 includes a relatively small central aperture 123 which affords flow from the actuating cylinder 39 to the pumping cylinder 51 when the valve member is seated against the bottom wall 97 of the cylindrical housing member 93. The valve member 121 is also formed to provide peripheral openings 127 allowing substantial flow around the periphery of the valve member 121 when the valve member is displaced from the bottom wall 97 of the housing member 93 in response to fluid flow from the pumping cylinder 51 to the actuating cylinder 39. The openings 127 provided by removal of material from the otherwise circular periphery of the valve member 121 are considerably larger than the central opening or aperture 127, whereby when the fluid flow occurs from the pumping cylinder 51 to the actuating cylinder 39, the peripheral openings 127, as well as the central aperture 123 are available for fluid flow, whereas when flow occurs from the actuating cylinder 39 to the pumping cylinder 51, such flow passes primarily through the restricted central aperture 123.

In order to retain the valve member 121 in a diametrical location relative to the axis of the cylindrical housing member 93 and to guide travel of the valve member 121 within the metering valve 91, and to space the valve member 121 from the cap 99 during fluid flow from the pumping cylinder 51 to the actuating cylinder 39, the valve member 121 includes two or more tabs 129 axially extending in the direction toward the cap 99. Such spacing of the valve member 121 from the cap 99 during fluid flow from the pumping cylinder 51 to the actuating cylinder 39, prevents the valve member 121 from moving into flush contact with the cap 99 and insures fluid flow capability through the peripheral openings 127 between the valve member 121 and the housing member 93, thereby causing roped release of the brake when the operator sits on the seat 61.

If desired, the seat 61 could be biased away and upwardly from the in-use position by means other than the spring 83, and independently of the lever 77. In such case, the lever 77 could be displaced toward the raised seat by the spring 43 in response to extension of the plunger 57 from the pumping cylinder 51 when hydraulic fluid is returned from the actuating cylinder 39 to the pumping cylinder 51 under the influence of the spring 43.

In operation, when the operator sits on the seat 61, the seat 61 moves against the action of the spring 83 to the in-use position, thereby pivoting the actuating lever 77 in the clockwise direction and engaging the striker plate 81 with the plunger 57 to depress the plunger 57 into the pumping cylinder 51. Such depression of the plunger 57 into the pumping cylinder 51 causes rapid fluid flow through the metering valve 91 to the actuating cylinder 39 with consequent spreading of the links 31 so as to rapidly release the brake shoes 29 from positions of braking engagement with the braking flange 27. So long as the operator remains on the seat 61, the fluid delivered from the pumping cylinder 51 to the actuating cylinder 39 will remain in the actuating cylinder 39 keeping the brake shoes 29 spaced from the braking flange 27. However, when the operator leaves the seat 61, the spring 83 will bias the lever 77 in the clockwise direction, thereby also lifting the seat 61 from the in-use position. Such movement in the counterclockwise direction of the lever 77 permits the plunger 57 to move outwardly of the pumping cylinder 51 and affords fluid flow from the actuating cylinder 39 to the pumping cylinder 51 in response to movement toward each other of the rams 37 acting under the influence of the spring 43. Such return fluid flow from the actuating cylinder 39 to the pumping cylinder 51 is restricted during travel through the metering valve 91 and, accordingly, the brake shoes 29 move relatively slowly to the position of braking engagement with the braking flange 29.

Various of the features of the invention are set forth in the following claims.

I claim:

1. A vehicle braking system comprising means biasing a brake shoe into braking engagement with a rotary member, hydraulically actuated means connected to said brake shoe for displacing said brake shoe from braking engagement with the rotary member, a cylinder including a plunger operable in said cylinder, a seat movably mounted on said vehicle for movement relative to an in-use position, a linkage engageable with said seat and engageable with said plunger to displace said plunger so as to afford delivery of pressure fluid from said cylinder, a metering valve hydraulically communicating with and between said hydraulic brake shoe displacing means and said cylinder, said metering valve affording relatively restricted fluid flow from said hydraulic brake shoe displacing means to said cylinder as compared to fluid flow from said cylinder to said hydraulic brake shoe displacing means, whereby to displace said brake shoe from braking engagement with the rotary member in response to movement of said seat to the in-use position.

2. A braking system in accordance with Claim 1 wherein said linkage includes a lever including a seat engaging portion and a plunger engaging portion, means mounting said lever on said vehicle for movement between a first position wherein said seat is raised from the in-use position in response to engagement of said seat portion and wherein said plunger engaging portion permits extension of said plunger from said cylinder and a second position wherein said plunger engaging portion effects displacement of said plunger inwardly of said cylinder in response to movement of said seat to the in-use position, and means biasing said lever to said first position.

3. A vehicle braking system comprising a brake shoe, a brake actuating link carrying said brake shoe and movably mounted on the vehicle for movement of said brake shoe relative to a position of braking engagement with a rotary member, a hydraulic actuating cylinder, a ram in said actuating cylinder connected to said brake actuating link and operable to displace said brake shoe from said position of braking engagement in response to the delivery of pressure fluid within said actuating cylinder, means biasing said brake shoe toward said braking position and for displacing pressure fluid from said actuating cylinder, a pumping cylinder hydraulically communicating with said actuating cylinder and including a plunger operable to effect delivery of pressure fluid from said pumping cylinder upon movement of said plunger into said pumping cylinder, a seat movably mounted on said vehicle for movement relative to an in-use position, a linkage engageable with said seat and engageable with said plunger to displace said plunger inwardly of said pumping cylinder so as to deliver pressure fluid from said pumping cylinder, and a metering valve hydraulically communicating with and between said actuating cylinder and said pumping cylinder, whereby to displace said brake shoe from said position of braking engagement in response to movement of said seat to the in-use position, said metering valve affording relatively restricted fluid flow from said actuating cylinder to said pumping cylinder as compared to fluid flow from said pumping cylinder to said actuating cylinder.

4. A braking system in accordance with Claim 3 wherein said linkage includes a lever including a seat engaging portion and a plunger engaging portion, means mounting said lever on said vehicle for movement between a first position wherein said seat is raised from the in-use position in response to engagement of said seat portion and wherein said plunger engaging portion permits extension of said plunger from said pumping cylinder and a second position wherein said plunger engaging portion effects displacement of said plunger inwardly of said pumping cylinder in response to movement of said seat to the in-use position, and means biasing said lever to said first position.

5. A braking system in accordance with claim 3 wherein said metering valve includes a hollow valve housing and a valve member movable in said valve housing to a first position adjacent to one end of the interior of said valve housing in response to fluid flow from said actuating cylinder to said pumping cylinder and movable to a second position spaced from the other end of said valve housing in response to fluid flow from said pumping cylinder to said actuating cylinder, said valve member including a central aperture, means defining peripheral openings between said valve member and the interior surface of said valve housing extending in the direction of movement of said valve member between said first and second positions, and means spacing said valve member from said other end of said housing when said valve member is in said second position.

6. A braking system in accordance with claim 1 wherein said metering valve includes a hollow valve housing and a valve member movable in said valve housing to a first position adjacent to one end of the interior of said valve housing in response to fluid flow from said hydraulic brake shoe displacing means to said cylinder and movable to a second position spaced from the other end of said valve housing in response to fluid flow from said cylinder to said hydraulic brake shoe displacing means, said valve member including a central aperture, means defining peripheral openings between said valve member and the interior surface of said valve housing extending in the direction of movement of said valve member between said first and second position, and means spacing said valve member from said other end of said housing when said valve member is in said second position.

* * * * *